US008024914B2

(12) United States Patent
Pilatti

(10) Patent No.: US 8,024,914 B2
(45) Date of Patent: Sep. 27, 2011

(54) DRAG-TYPE COTTON HARVESTER OPERATED BY AN INDEPENDENT DRIVING UNIT

(75) Inventor: Orlando Francisco Pilatti, Provincia de Santa Fe (AR)

(73) Assignee: Instituto Nacional de Tecnologia Agropecuaria, Buenos Aires (AR)

( * ) Notice: Subject to any disclaimer, the term of this patent is extended or adjusted under 35 U.S.C. 154(b) by 0 days.

(21) Appl. No.: 11/731,395

(22) Filed: Mar. 30, 2007

(65) Prior Publication Data

US 2007/0234696 A1    Oct. 11, 2007

(30) Foreign Application Priority Data

Mar. 30, 2006    (AR) ................................ P060101263

(51) Int. Cl.
*A01D 46/08*    (2006.01)

(52) U.S. Cl. ..................................... 56/30; 56/33; 56/34

(58) Field of Classification Search ................ 56/28, 30, 56/33–35
See application file for complete search history.

(56) References Cited

U.S. PATENT DOCUMENTS

| 1,646,455 | A | * | 10/1927 | Johnson et al. | 56/15.3 |
|---|---|---|---|---|---|
| 1,690,375 | A | * | 11/1928 | Mitchell et al. | 19/41 |
| 1,990,816 | A | * | 2/1935 | Conrad | 19/36 |
| 1,992,429 | A | * | 2/1935 | Hyman | 280/413 |
| 2,445,162 | A | * | 7/1948 | Wallace | 56/34 |
| 2,517,063 | A | * | 8/1950 | Wallace | 56/34 |
| 2,526,535 | A | * | 10/1950 | Brown | 19/38 |
| 2,869,307 | A | * | 1/1959 | Wagnon | 56/30 |
| 3,067,561 | A | * | 12/1962 | Jezek | 56/34 |
| 3,512,237 | A | * | 5/1970 | Brooks et al. | 56/28 |
| 3,959,956 | A | * | 6/1976 | Fowler | 56/30 |
| 4,470,245 | A |   | 9/1984 | Agadi |   |
| 6,421,991 | B1 | * | 7/2002 | Goering et al. | 56/28 |

* cited by examiner

*Primary Examiner* — Alicia Torres

(57) ABSTRACT

A drag-type cotton harvester operated by an independent driving unit, which comprises a stripper-type cotton picker platform having a series of fingers that are aligned parallel to the forward direction of the machine, wherein the front ends of the fingers are close to ground level and the back ends thereof are ramped in an upward direction; a cleaning apparatus that receives the picked cotton from the picker platform, which cleaning apparatus comprises a set of rotary dentate cylinders that engage the cotton and remove the heavy masses or impurities therefrom, while a rotary brush that is disposed tangential to the dentate cylinders disengages the clean cotton from the aforementioned fingers; and a trailer that receives the clean cotton from the cleaning apparatus, then stores it and transports it.

6 Claims, 3 Drawing Sheets

CORTE a : a'

CORTE b : b'

DRAG-TYPE COTTON HARVESTER OPERATED BY AN INDEPENDENT DRIVING UNIT

TECHNICAL FIELD OF THE INVENTION

The present invention relates to drag-type cotton harvester that is actuated by an independent driving unit. In particular, the present invention relates to an operating unit that is towed by a tractor, which operating unit is made up of a cotton picker platform of the "stripper" or collector type, which is integral with a cotton cleaning apparatus, wherein the assembly is driven by the power supply of the tractor. As a necessary supplement, it features a hopper or cage-type trailer to receive the cotton that has been picked and cleaned, which trailer is, in turn, towed by the same tractor.

STATE OF THE ART AND PROBLEMS TO BE SOLVED

The mechanical harvest of cotton features various systems and harvester models, the use of which became most widespread in the second half of the twentieth century.

In the various cotton growing areas of the world, cotton harvesting is done in a manual, mechanical or "mixed" manner according to the scaling, production modes and social and economical and technological conditions in the producing countries.

Among mechanical systems, self-driven harvesters, of great technological complexity, which are especially suitable for large-scale producing systems and high economic capacity, are prevalent.

The present invention is directed to drag-type operating unit that is composed of a "stripper" or collector-type harvesting platform that is integral with a cotton cleaning apparatus, wherein the assembly is driven by the power supply of the tractor. As a necessary supplement, it features a hopper or cage-type trailer to receive the cotton that has been picked and cleaned, which trailer is, in turn, towed by the same tractor.

Nowadays two essentially different cotton harvesting systems are most common.

They are "plucking" or "picking", and the pulling or "stripper" machines.

The pickers have cotton capture and extraction cotton in the form of spindles, spikes or vertical bars, which remove the lint from the boll by means of small teeth or ridges with as few impurities as possible. They are self-driven, highly complex harvesters that are very expensive to acquire and maintain.

The pullers or "strippers" remove the whole boll from the plants, with carpels and other components of the dry fruit, as well as other solids that are peeled off in the process. They are more simple machines, even though this kind of system can be supplemented with cotton cleaning means in order to release the largest number of impurities from the lint.

Both of the aforementioned systems, and their variants, are available as self-driven machines, which are exclusively intended for cotton harvesting and which are relatively operated for a few hours a year, unlike the cereal and oil bearing plant harvesters, most of which can harvest various species by just exchanging their picking platforms, by a simple exchange of their picking platforms.

Reality has shown that various machines and technological resources are available for the mechanical harvesting of cotton, but the incidence of the crop economy, as much as regards to the purchasing cost as the operating cost per unit of throughput makes these means difficult to access and use, especially for medium to small cotton growers in many countries.

Therefore, from the technical-economic point of view, a requirement or demand for alternatives or innovations that may bring other solutions to the problem of cotton harvesting.

U.S. Pat. No. 4,470,245 discloses a cotton harvesting method and machine that is towed by a tractor, which operates on spaced apart individual rows (as seen in the sketch). It is different in that it cuts cotton plants low and once inside, it then removes the lint from the rest of the plant. However, it does not forestall or interfere with, or contradicts our application in any way.

U.S. Pat. No. 3,959,956 discloses a cotton harvesting machine which, while not of a drag-type, particularly claims a lint removal or gin system, which relies on pneumatic forces or high speed pneumatic streams, by means of tubing and separator chambers. These features are different from the subject cleaning or "dehulling" equipment, which is essentially mechanical, in that it uses only air streams to lift the cotton and discharge it into the trailer or hopper. On the other hand, it discloses a collector apparatus for two separate independent rows or furrows along which harvest is carried out.

The platform of the present invention is different in that it is wide, and it harvests across its whole width regardless of furrows, that is, not only does it not "hit" on individual furrows but it particularly picks crops from densely planted fields with narrow rows and minimal separation, and even regardless of the direction of the furrows but across them or in a biased direction.

The present invention provides a suitable alternative for the achievement of an efficient harvest and for preserving the inherent features of cotton lint.

It is worth stating that this harvesting system is particularly suitable for crops wherein narrow rows are used, that is, crops that are planted in a high density of plants and with greater yield potential.

BRIEF DESCRIPTION OF THE INVENTION

The present invention discloses a machine that is characterized in that the picker platform or stripper apparatus is integral with a cotton cleaning apparatus, thus forming a single operating unit or machine, the most important feature of which is that it is of a drag or tow-type and it is operated by a common agriculture tractor.

The collected cotton is cleaned and then stored in a hopper trailer, which is in turn towed, thus forming a "tandem" with the harvester.

BRIEF DESCRIPTION OF THE DRAWINGS

For a better understanding of the invention, the preferred embodiment thereof is illustrated by the following drawings, wherein:

FIG. 1 is a plane view of the harvester with the cleaning apparatus and the manner in which the tractor is hitched, as well as a partial view of the trailer the cotton is transferred to.

Throughout the drawings, the same figures denote similar elements or components.

DETAILED DESCRIPTION OF THE INVENTION

The drag-type cotton harvester herein disclosed brings the following essential components together, thus forming an operating unit: A) A cotton boll picker platform or apparatus; B) a cotton lint cleaning apparatus and C) a cotton-receiving trailer or towed unit.

For a better understanding of the subject assembly, there is disclosed the manner in which the various parts that make up the assembly are connected and their function.

Figure 1:
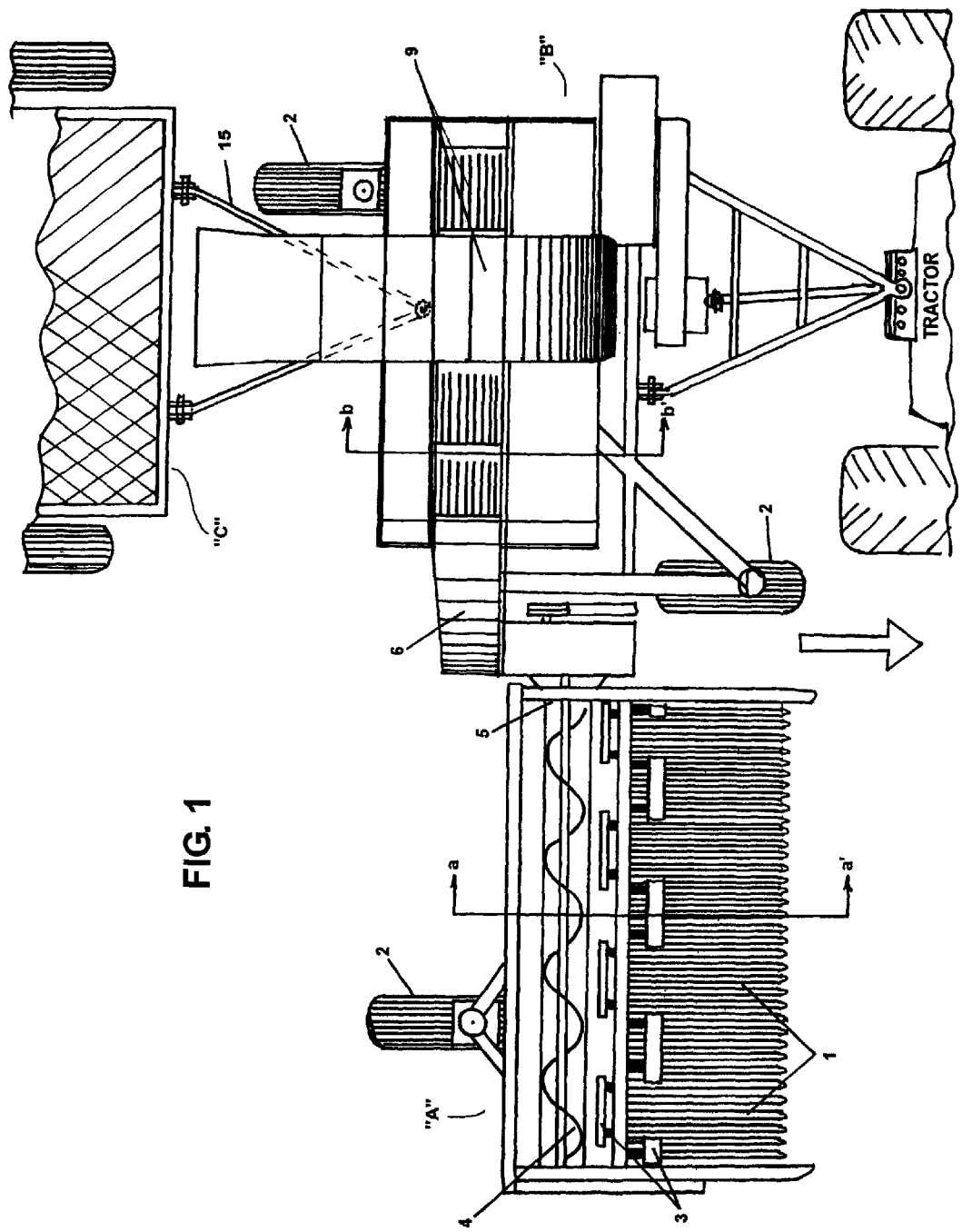
Figure 2:
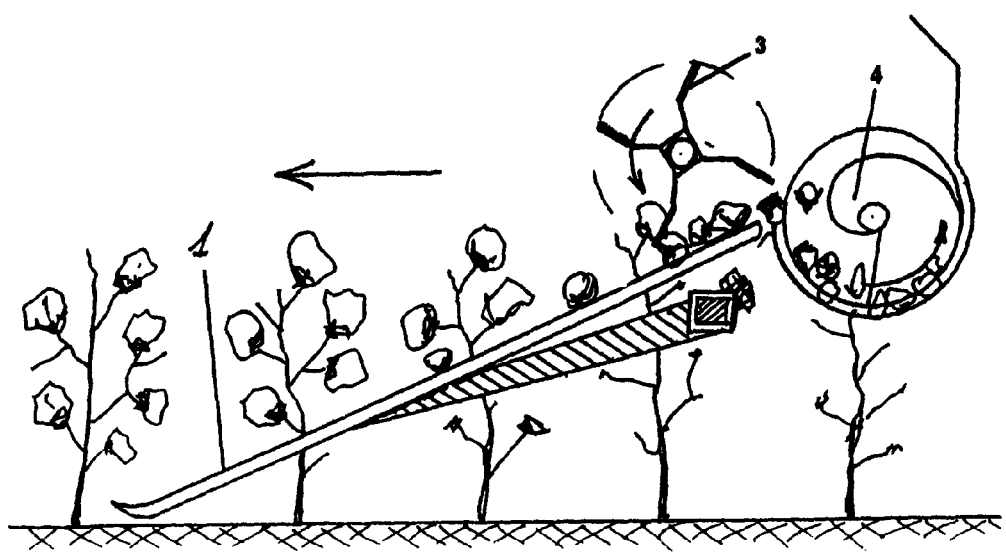
FIGS. 2 and 3 show exploded views of the main components of the drag-type (towed) harvester: the picker platform (FIG. 2) and the cleaning apparatus (FIG. 3)

In FIG. 1, there is shown at A a cotton picker platform or apparatus, which consists of a "comb"-shaped cotton stripper that consists of "combs" made up by a set of elastically mounted rigid metal spikes or fingers 1, in an adjacent arrangement, that are spaced apart by gaps or slots between the adjacent fingers. FIG. 2 shows that such fingers are aligned parallel to the forward direction of the machine and wherein their front ends are very close to ground level and their back ends are raised, thus forming an upward slanted ramp at 15° to 30° from the horizontal plane. Each finger or spike has a V-shaped cross section. The cotton picker platform is able to pick cotton from narrow rows less than 50 cm wide.

As the machine assembly advances as it is towed by the tractor and rolls on its own wheels 2, cotton plants enter the gaps or slots among the spikes or fingers 1 which, given their slanted arrangement, go through them in an upward direction, thus pulling or picking the whole bolls, since these are too large to pass through the slots.

As the succession of plants go through and are "combed" by the platform they are stripped of the bolls and moved in a backward and upward direction, the bolls being moved and driven by a rotary "beater" of flexible radial blades 3. Thus propelled, the cotton bolls enter a groove wherein there is an axle with a spiral conveyor 4. The rotary action of this spiral conveyor transfers the cotton to point 5, wherein it is lifted by an air stream from tubing 6, or by an elevator pump, and deposited on top of the cleaning apparatus "B".

Figure 3:
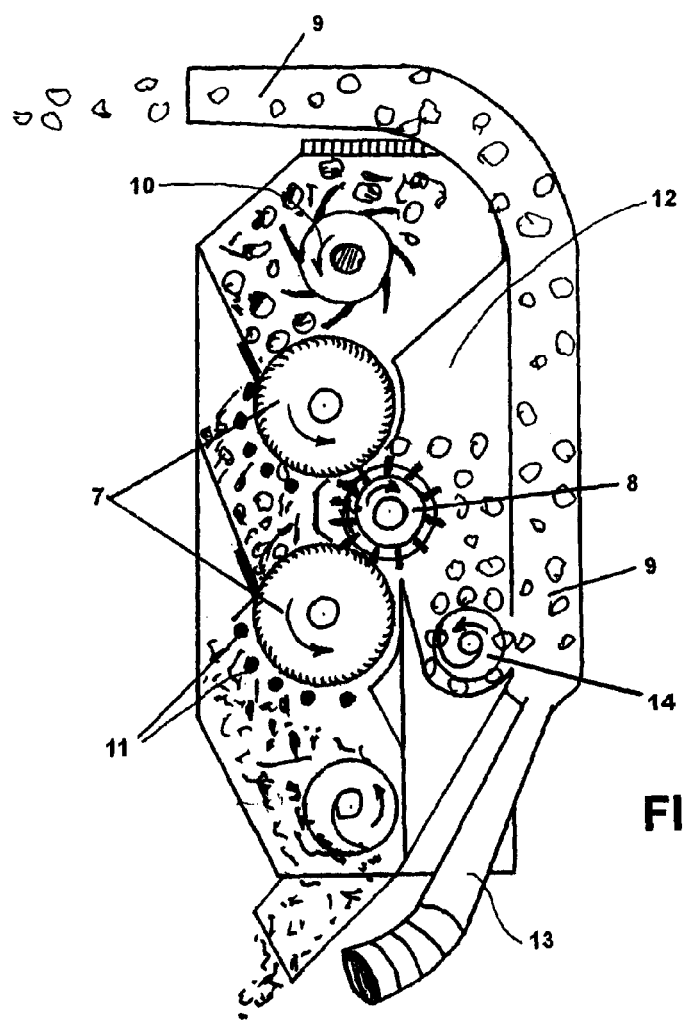
Figure 4:
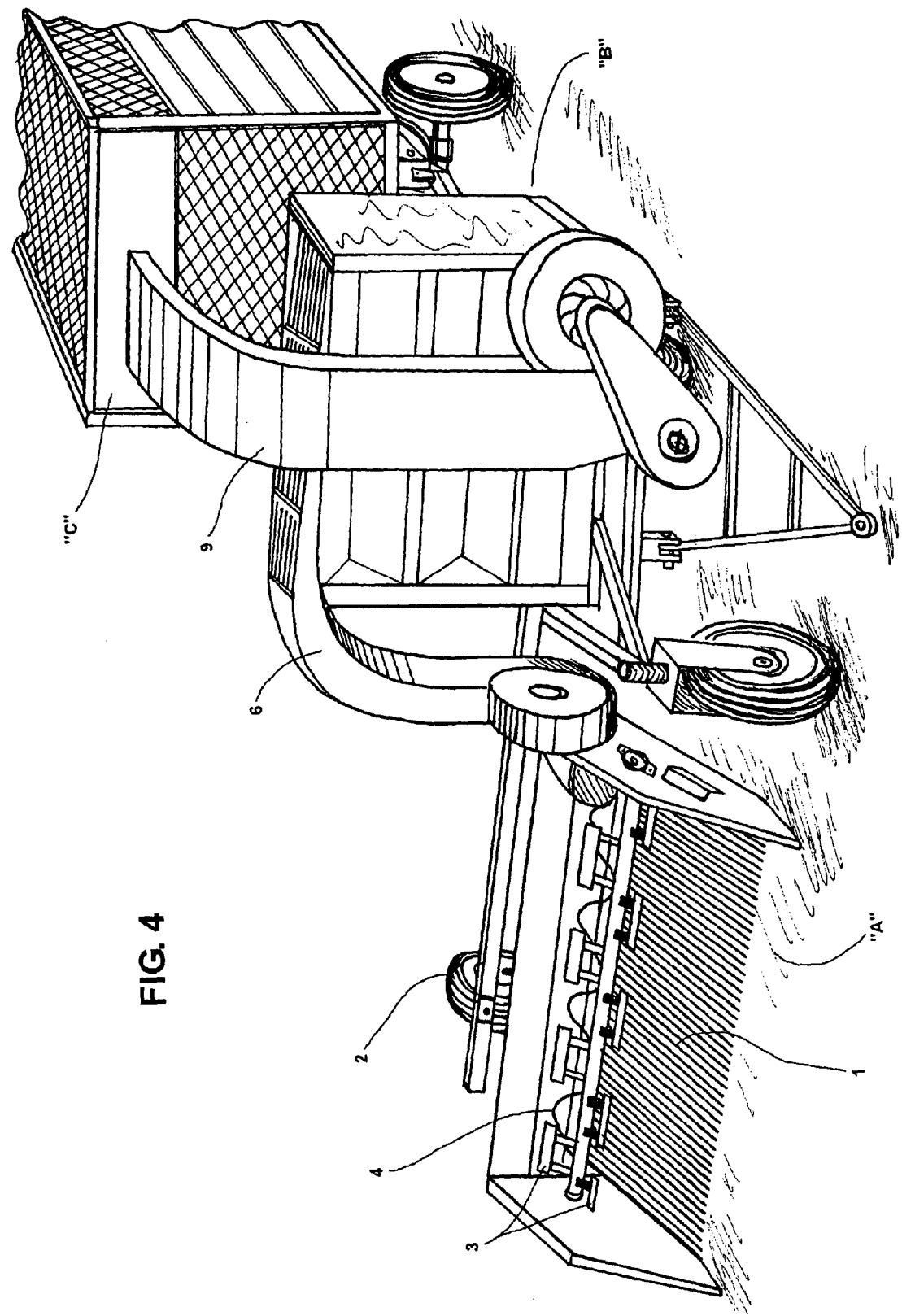
FIG. 4 is a panoramic view of the trailer assembly that shows the possible spatial distribution of its components.

FIG. 3 shows that the object of the continuously-operated cotton lint cleaning apparatus "B" is to remove the major impurities (green capsules, carpels, twigs, etc.), thus improving on the harvested product.

The cotton exiting the picker platform, which is raised by an air stream, enters the cleaner through the top, and it is then distributed across the apparatus, as it escapes the propelling air through the comb-shaped grid over the top. From the top of the cleaner, cotton is treated by an "opening" cylinder 10 that comprises a plurality of relatively large fingers, and then it is captured by the first cleaning or "dehulling" cylinder 7, which somehow spins it, thus retaining the cotton and removing impurities through the bars 11. The remaining cotton is treated in a similar manner by the next cylinder or "recuperator" 7. The high speed rotary brush 8, which is tangential to the above cylinders, disengages the clean cotton attached to them and discharges it into an adjacent chamber 12. A spiral conveyor 14 gathers and passes it on to an upward air stream, which directs it and propels it in an upward direction through tubing 9, then discharging it into the receiving hopper or trailer. A blower nozzle 13 raises the clean cotton through the tubing 9 into the trailer.

In this manner, cylinders 7 having dentate or saw-toothed sectors or straps around their periphery, rotate and engage the cotton, thus providing a centrifugal effect on it, and removing any heavy masses or impurities.

The rotary brush 8, in turn, being tangential to the dentate sectors 7, the tangential speed of which is higher than that of the cylinders, removes the clean cotton from the fingers of such cylinders, after which it directs it to a pneumatic tubing 9, which discharges it into the cage-type trailer wherein it is to be stored.

The cage-type trailer "C" receiving the cotton from the cleaning apparatus and storing and transporting it, is one of the components of the machine that is connected to the assembly by a hitch or tow bar 15 and it is towed or trailed in tandem with the other components, thus completing the harvesting operation.

It is an essentially lightweight trailer having high railings that can be made of wire mesh and its top plane or "roof" is covered to prevent cotton from being flown off by the driving air stream.

When filled with cotton, such trailer can be unhitched and unloaded at an appropriate lot or place by means of an unloading mechanism, to be then rehitched to the harvester; or it can alternatively be replaced by another empty trailer while the first one is being used to transport cotton to the ginning plant or to a storage facility.

The invention claimed is:

1. A drag cotton harvester operated by an independent driving unit, comprising:
   a stripper cotton picker platform comprising wheels that allow the picker platform to be dragged laterally offset with respect to the whole width of the independent driving unit wherein the picker platform picks crops from high density cotton fields where rows of cotton plants are separated by less than 50 cm and wherein the picker platform has a series of elastically mounted rigid metal fingers aligned parallel to the forward direction of the harvester, wherein the front ends of the fingers are close to ground level and the back ends thereof are ramped in an upward direction wherein each elastically mounted rigid metal finger has a V-shaped cross section extending from the front end to the back end thereof and wherein the metal fingers are spaced apart by gaps between adjacent fingers in an adjacent arrangement such that the series of fingers comprise combs to pick cotton from narrow rows separated by less than 50 cm, and a rotary cylinder of flexible radial blades that propels cotton bolls into a groove with a spiral conveyor that conveys cotton bolls to a tube through which they are lifted by an air stream or by an elevator pump;
   a cleaning apparatus to receive harvested cotton from the picker platform, the cleaning apparatus comprising a set of rotary dentate cylinders that engage the cotton and remove the heavy masses or impurities therefrom, the cleaning apparatus comprising a rotary brush that is arranged tangential to the dentate cylinders to disengage clean cotton from the rotary dentate cylinders therein, a spiral conveyor that gathers the clean cotton and passes it on to an upward air stream, which propels it in an upward direction that, through a tube, discharges it into a trailer that receives the clean cotton from the cleaning apparatus, for storage and transport.

2. A drag-type cotton harvester as set forth in claim 1 wherein said series of fingers mounted in the picker platform forms an upward slanted ramp at 15° to 30° from the horizontal plane.

3. A drag-type cotton harvester as set forth in claim 1 wherein the cleaning apparatus comprises an opening cylinder with a plurality of relatively large fingers that treats the cotton.

4. A drag-type cotton harvester as set forth in claim 3 wherein the set of rotary dentate cylinders of the cleaning apparatus comprises a first cleaning cylinder that spins the cotton thus retaining the cotton and removing impurities through bars and a second cylinder that treats the remaining cotton.

5. A drag-type cotton harvester as set forth in claim 4 wherein the cleaning apparatus comprises the high speed rotary brush tangential to said first and second cylinders that disengages the clean cotton attached to them and discharges it into an adjacent chamber.

6. A drag-type cotton harvester as set forth in claim 1 wherein the cleaning apparatus comprises a blower nozzle that produces an upward air stream that propels the cotton in an upward direction through a tube and into a trailer.

\* \* \* \* \*